(12) United States Patent
Yi et al.

(10) Patent No.: US 10,839,303 B2
(45) Date of Patent: Nov. 17, 2020

(54) AUTOMATIC DETECTION AND CORRECTION OF LICENSE PLATE MISIDENTIFICATION

(71) Applicant: SAP SE, Walldorf (DE)

(72) Inventors: Chang Yi, Shanghai (CN); Qiong Luo, Nanjing (CN); Guangji Zhu, Nanjing (CN); Chao Yu, Nanjing (CN); Qiwei Zhang, Shanghai (CN); Yinling Ni, Shanghai (CN)

(73) Assignee: SAP SE, Walldorf (DE)

( * ) Notice: Subject to any disclaimer, the term of this patent is extended or adjusted under 35 U.S.C. 154(b) by 706 days.

(21) Appl. No.: 15/681,961

(22) Filed: Aug. 21, 2017

(65) Prior Publication Data

US 2019/0057315 A1 Feb. 21, 2019

(51) Int. Cl.

| | |
|---|---|
| *G06N 5/04* | (2006.01) |
| *G06N 7/00* | (2006.01) |
| *G06N 3/08* | (2006.01) |
| *G06K 9/32* | (2006.01) |
| *G06K 9/00* | (2006.01) |
| *G06N 20/00* | (2019.01) |

(52) U.S. Cl.
CPC ......... *G06N 7/005* (2013.01); *G06K 9/00771* (2013.01); *G06K 9/3258* (2013.01); *G06N 3/08* (2013.01); *G06N 20/00* (2019.01); *G06K 2209/01* (2013.01); *G06K 2209/15* (2013.01); *G06N 5/04* (2013.01)

(58) Field of Classification Search
None
See application file for complete search history.

(56) References Cited

U.S. PATENT DOCUMENTS 8,559,673 B2 * 10/2013 Fairfield ............ G06K 9/00825
382/104
2017/0185868 A1 6/2017 Wang et al.

OTHER PUBLICATIONS

Li, Vehicle License Plate Detection and Recognition, Master's Thesis, University of Missouri, 2010, pp. 1-69 (Year: 2010).*

(Continued)

*Primary Examiner* — Wilbert L Starks
(74) *Attorney, Agent, or Firm* — Sterne, Kessler, Goldstein & Fox P.L.L.C.

(57) ABSTRACT

Disclosed herein are system, method, and computer-readable device embodiments for automatically correcting erroneous license plate numbers generated by automatic license plate recognition. An embodiment operates by selecting a set of adjacent license plate recognition (LPR) stations comprising a first LPR station, a second LPR station, and a third LPR station, accessing an error pattern probability matrix for at least the third recognized license plate number accessed in relation to at least one of the first recognized license plate number or the second recognized license plate number differing from the third recognized license plate number, and determining a corrected license plate number based on the error pattern probability matrix. In some embodiments, LPR correction may be accurately realized even when an erroneous license plate numbers are missing characters, such as by visual obstruction from an LPR camera or sensor, or has no characters in common with the real license plate number.

20 Claims, 5 Drawing Sheets

(56) References Cited

OTHER PUBLICATIONS

Albera, Vehicle Logo Recognition Using Image Processing Methods, Master's Thesis, Atlim University, 2016, pp. 1-76 (Year: 2016).*
Boonsim, Car make and model recognition under limited lighting conditions at night, Doctoral thesis, University of Bedfordshire, 2016, pp. 1-176 (Year: 2016).*
Co-pending U.S. Appl. No. 15/681,931, by Yi et al., entitled "Automatic Identification of Cloned Vehicle Identifiers" filed herewith.

\* cited by examiner

AUTOMATIC DETECTION AND CORRECTION OF LICENSE PLATE MISIDENTIFICATION

CROSS REFERENCE TO RELATED APPLICATIONS

This application is related to co-pending U.S. patent application Ser. No. 15/681,931, by Yi, et al., entitled "Automatic Identification of Cloned Vehicle Identifiers" and filed Aug. 21, 2017, which is hereby incorporated by reference in its entirety.

BACKGROUND

One part of mass surveillance of transport vehicles on roads and highways involves the use of automated cameras and optical character recognition (OCR) to log license plate numbers corresponding to license plates (number plates or license tags) of registered automobiles and other vehicles at a specific location corresponding to a given camera. Such methods may be called automatic license plate recognition (LPR) or automatic number plate recognition (NPR or ANPR). These methods are increasingly relied on for monitoring traffic flows in road networks, controlling other moving assets, tracking stolen vehicles, identifying dangerous drivers and other suspicious vehicles, etc.

However, even the most advanced of existing LPR technologies to date have been unable to achieve 100% accuracy in recognizing license plate numbers, sometimes misidentifying license plate numbers more than 40% of the time. These incorrect LPR data may be the results of malfunctions in the LPR cameras and/or sensors, inherent limitations in OCR algorithms, certain weather conditions, poor illumination, excess speed of the vehicle passing by, obstacles partially obstructing the visual field of the camera and/or the plate itself, and/or any combination of these factors and others.

Inaccurate results may mislead tracking efforts for particular vehicles, which in turn may make any trends or patterns based on the inaccurate results less reliable and less trustworthy. Additionally, if inaccurate results cannot be recognized as inaccurate, it becomes difficult if not impossible to determine the source of inaccuracies, such as a faulty or malfunctioning camera or sensor, for example, at least not without manually testing and observing every camera and sensor.

Such manual detection often requires considerable time and resources, especially as the amount of data increases with more LPR stations, cameras, and vehicles under surveillance. Modern city-wide intelligent transportation systems (ITS) may have on the order of thousands if not tens of thousands of cameras and/or sensors, in total generating many millions of LPR records daily. However, to date, the only way to ensure accuracy and diagnose malfunctioning cameras and sensors has been via manual testing and observation and/or additional sensor data (such as from RFID tags on vehicles), which have proven extremely costly and otherwise problematic as LPR records increase in number and complexity.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for automatically detecting and correcting misidentified license plate numbers retrieved from automatic license plate recognition data.

Described herein are embodiments for correcting the misidentified LPR records using machine learning, automatically analyzing only the LPR data itself, without a need for additional types of sensors or manual intervention by human operators. By analyzing trajectories of similar license plate numbers, driving patterns with certain spatiotemporal characteristics will be learned for error pattern training to correct the final data. Some embodiments, to identify LPR data errors, may be fully driven by data, and may be readily scalable for widespread adoption and mass deployment across large and/or populous areas.

In certain embodiments, the most similar plate in a candidate plate number set for corrections may be leveraged in correct recognized license plate numbers that appear to have likely been misidentified. A similarity measurement may be calculated according to an error pattern across multiple LPR sensors. The candidate plate numbers may be those LPR-identified plate numbers within the temporal and spatial span of the real vehicle, which may be estimated by a driven pattern. In other words, candidates may be identified by probability of having LPRs of certain character patterns within certain thresholds of spatial and temporal distance separating members of a given set of LPR records. The driven pattern contains the sequence of at least three (3) adjacent stations and the trip time distribution between them. The error pattern can be learned by the tagged LPR record estimated by the driven pattern and represented by an error pattern probability matrix. An exemplary framework is shown in FIG. 1, according to some embodiments.

Figure 1:
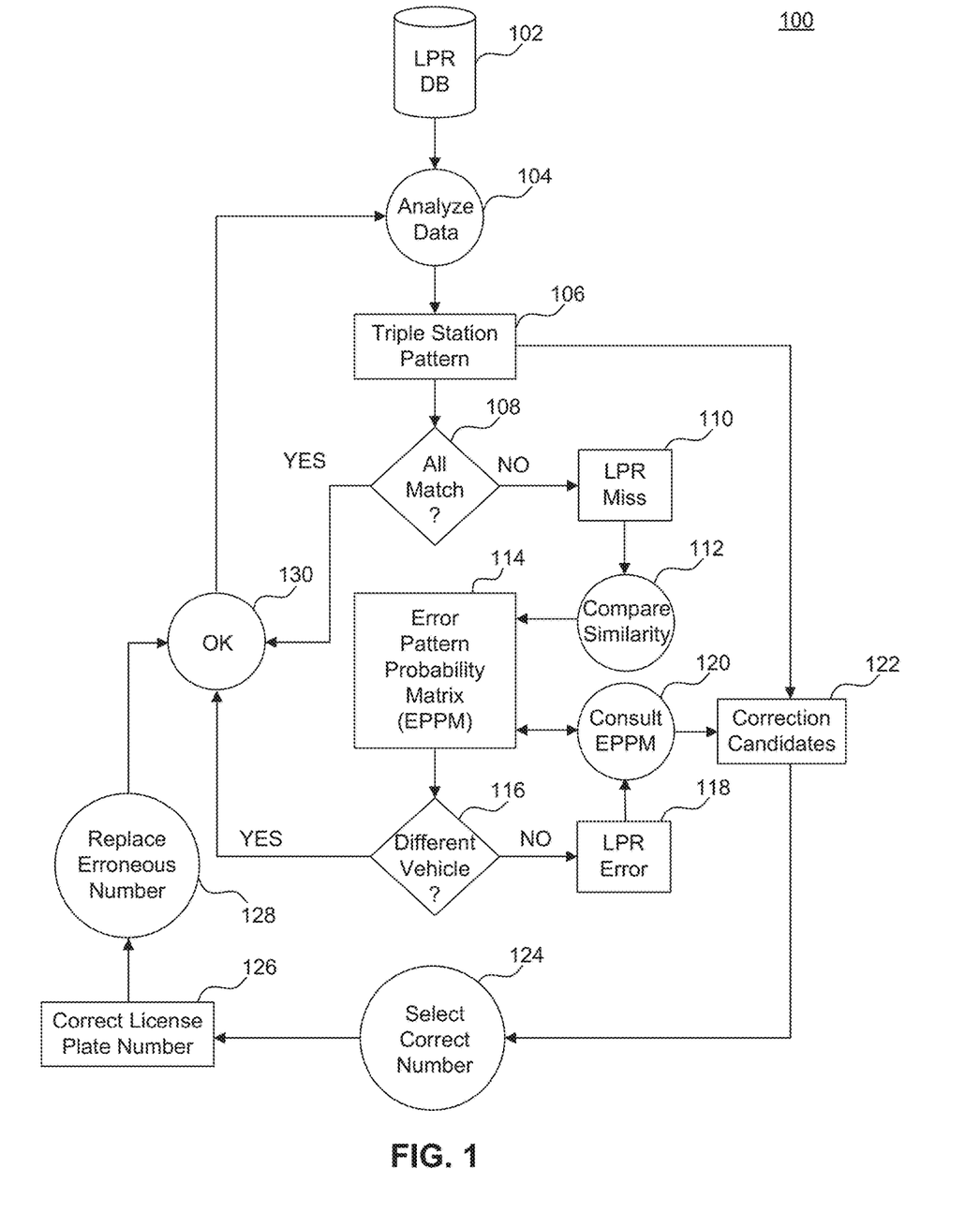
FIG. 1 is a block diagram illustrating states and execution flow within an example embodiment of a framework for fully data-driven automatic detection and correction of misidentified license plate numbers, according to some embodiments.

FIG. 1 is a block diagram illustrating states and execution flow within an example embodiment of a framework for fully data-driven automatic detection and correction of misidentified license plate numbers, according to some embodiments. Any operations or operational flow depicted herein may be executed sequentially in any order, or they may alternatively be executed concurrently, with more than one operation being performed simultaneously, or any combination of the above.

Any operation herein may be performed by any type of structure in the diagram, such as a module or dedicated device, in hardware, software, or any combination thereof. Any block in the block diagram of FIG. 1 may be regarded as a module, apparatus, dedicated device, general-purpose processor, engine, state machine, functional element, or related technology capable of and configured to perform its corresponding operation(s) described herein.

Underlying LPR error detection and correction framework 100, LPR database 102 may be employed. LPR database 102 may store and retrieve data using any known means of structured and/or unstructured data storage and/or retrieval. In some embodiments, LPR database 102 may be an in-memory database, or may otherwise involve a database management system (DBMS), for example.

As illustrated in FIG. 1, at 104, data analysis operation(s) may be performed on raw LPR data records, such as to effect machine learning of trip times and sets of triple adjacent stations, which may indicate certain driving patterns, as shown at 106 as a triple station pattern. Trip time of a specific vehicle between any two adjacent LPR stations may be a factor that may be used to determine a driving pattern, as is further described below with respect to FIGS. 2A and 2B. Between multiple pairs of stations, multiple trip times may be assembled into trip-time distributions. For example, there may be two trip times, one between stations A and B, and another between B and C, with A being adjacent to B and B being adjacent to C. In some other embodiments, a larger number of stations or pairs may be in a set for any pattern that an operator or implementer may require or optionally wish to correlate, such as a quadruple station pattern, quintuple station pattern, etc., in lieu of triple station pattern 106.

Due to the spatial proximity of adjacent LPR stations and directional limitations of roadways, the driving pattern may be expected to follow certain sequences of LPR stations that are in consecutive orders; a vehicle may not pass by arbitrary stations without passing certain other stations along the way, just as a matter of physical positioning. The driving pattern may be characterized by the trip time distribution and sequences of triple adjacent stations.

In some embodiments, the number of adjacent stations in a set for determining whether a vehicle may have passed by with incorrect LPR may be more or fewer, depending on the level of confidence desired for identifying and evaluating candidates for error detection and correction. For example, with only one pair of LPR records from two LPR stations, a discrepancy between LPRs may be identified, but the level of confidence may not be as high as with more LPR stations. As a general rule, a confidence interval increases with the number of LPR records and/or stations represented in a set as unique data points. However, each subsequent increase in confidence becomes more gradual with each subsequent increase in the number of data points considered.

As may also be apparent from FIG. 1, the data analyzed to determine driving patterns may be retrieved from a single LPR database, in some embodiments. In other embodiments, distributed and/or unstructured big data may be used to effect similar results.

Further, in the example of FIG. 1, at 108, operation(s) may be performed to effect detection of potentially erroneous license plate numbers, according to an embodiment. For example, if LPR stations in a set unanimously report the same license plate numbers, such as in a triple station pattern of LPRs each matching each other, then it may be considered unlikely that there would be an error, and this may be regarded as an accurate set of LPR records, moving to OK 130 state with respect to this set of LPR records. In some embodiments, following OK 130, regardless of how execution in the framework led to OK 130, any subsequent execution may likely return to 104, such as to analyze subsequent data records or data sets, if there are any. OK 130 may involve other operations, such as updating a list of whitelisted or verified LPR records, for example, to indicate that they have been checked for erroneous LPR values.

Returning to the description of 108, if any of the LPR records in triple station pattern 106 does not match any of the others, then this may be recognized as an LPR miss 110, which may or may not be an erroneous LPR record. For example, in some cases, the different license plate number in a triple station pattern could actually be a different vehicle, which may coincidentally have been driving along the same route around the same time, rather than an incorrect or falsely recognized license plate number. Another way to describe LPR miss 110 would be an LPR error detection candidate, or simply error candidate.

To further such a determination of erroneous LPR, framework 100 may be used to compare similarity 112 of the different LPR records in triple station pattern 106. Aiding this comparison may be the error pattern probability matrix (EPPM) 114. An example EPPM is shown in Table 2 further below. Probability values in EPPM 114 may be static, in some embodiments, as derived from a fixed set of rules for optical character misrecognition or misidentification with certain sets of glyphs in license plates, for example. In other embodiments, EPPM values may be dynamically updated based on empirical evidence, training sets, calibration sets, other real-time data collection, and/or manual input. EPPM may be accessed and used to determine a likelihood of whether a different LPR record may be actually that of a different vehicle having a different license plate with a different license plate number, or whether the LPR record itself may have been falsely recognized and thereby erroneous.

Following calculations of EPPM values (not shown in FIG. 1; see Table 2 and accompanying description further below) with respect to a predetermined threshold selected by an operator or implementer, it may be determined at 116 whether the different LPR record is actually that of a different vehicle having a different license plate with a different license plate number, or whether the LPR record is erroneous. If 116 determines positively that the different LPR record originated with a different vehicle, execution proceeds to OK 130 and then back to 104.

Returning to the description of 116, if a distinct vehicle cannot be determined from EPPM 114, it may be assumed that the LPR record is erroneous, and the record may be tagged as an LPR error 118. Following this designation, the erroneous LPR record of LPR error 118 may be referred to 120 for error correction. Thus, at 116, an error detection method may be employed to determine whether certain different license plate numbers may in fact be erroneous captures of the same actual license plate falsely recognized by at least one LPR station, even if a significant number of characters may be missing or different from another recognized license plate number.

At 120, EPPM 114 may again be accessed, consulting EPPM to determine high-probability candidates for correction, at least depending how many characters and which characters are different in triple station pattern 106. Thus, actual LPR data correction candidates 122 may be generated with reference to 106 in addition to 114 and/or 120. Correction candidates 122 may be generated using iterative and/or recursive processes and/or algorithms, look-up table (LUT) references, heuristics, big-data analytics, deep learning, and/or any combination of the above or similar techniques that may involve probabilistic matching rule(s) to tag misidentified plate numbers, associating potentially erroneous plate numbers with corresponding potentially correct plate numbers from a candidate plate number set.

Depending on available correction candidates 120 and predetermined thresholds and/or other selection methods, at 124, a correct license plate number 126 may be selected as a top candidate for LPR error correction. In some embodiments, if there are no correction candidates 122, or no correction candidate successfully emerges from any of the above selection techniques, it may be possible that there is no correct license plate number 126 to be determined at 124. In this case, in some embodiments, the data of triple station pattern 106 may be discarded, restarting execution at 104.

Ultimately, at 128, the selected top candidate, as the correct license plate number 126, may be used to replace any erroneous or falsely recognized LPR records, substituting the correct license plate number 126 in lieu of any falsely recognized or erroneous license plate number. At this point, execution may proceed to OK 130, and again back to 104.

Indeed, it may be possible that EPPM 114 and selection criteria employed at 116 do not find LPR miss 110 to belong to a different vehicle, but nonetheless may be unable to find any suitable correction candidates 122, for example, owing to excessive ambiguity in potentially misrecognized characters, excessive obstruction (missing characters), poor visibility uniformly adding too much noise to a captured image, etc. Still, in some other embodiments, such a lack of a suitable correction candidate may result in an error being flagged (not shown) in framework 100, and the triple station pattern 106 data being separately collected for manual review.

Additionally, in the example of FIG. 1, EPPM 114 may be updated based on error patterns learned from the LPR data tagged by various types of error pattern learning, according to an embodiment. The error pattern probability matrix may be updated with all possible characters in a given license plate or candidate license plate, along with the probability of such characters to be misrecognized for other corresponding characters for the given LPR station that provided the specific LPR data point being analyzed.

Moreover, in 116, for example, LPR records may be associated with one or more different LPR stations. The recognition data and may be continuously acquired and stored by cameras and/or sensors of the LPR in, for example, a data repository (e.g., in-memory database for faster retrieval), in some embodiments. Each LPR record may include the recognized registration identifier, location of sensor, and passing time, among other metadata, in some embodiments.

An error detection module may detect at least one erroneous (falsely recognized) LPR record associated with a given LPR station. In some embodiments, the erroneous LPR record may be tied even to a specific camera and/or sensor. The LPR records may include, for example, LPR records acquired by a given LPR sensor within a day. The error detection may be performed based on a predetermined rule. For example, the error detection module may identify erroneous LPR records by searching, from the recognition data, for a record that is captured (or occurred) less than a predetermined threshold value $\mu$ (e.g., 2) in a predetermined amount of time (e.g., 12 minutes). The predetermined threshold value $\mu$ and predetermined amount of time may be changed according to, for example, city size and traffic flow.

This predetermined rule may be based on the observation that since the number of possible registration identifiers may be typically much larger than the actual number of registered vehicles in a given area, it may be unlikely for a vehicle with a falsely recognized registration identifier to be traveling on the same street on the same day as another vehicle with an actual registration identifier that may be exactly the same as the license plate number of the erroneous LPR record. Additionally, in some embodiments, the predetermined amount of time may be adjusted based on factors such as speed limits on roads near the LPR stations, traffic volumes, real-time traffic delay information, and desired margin for error, etc. The term "amount of time" may also be referred to as a "time frame," "time period," "period of time," etc.

Additionally, different cameras and/or sensors are unlikely to generate erroneous LPR records the same as other cameras and/or sensors, especially at different LPR stations. Accordingly, a number of occurrences (or captures) of each LPR record in a connected road network within a predetermined amount of time may provide the probability of recognition error.

If the occurrence number within the amount of time is less than a threshold value, this registration identifier may be considered likely to be erroneous or falsely recognized. Other methods of LPR error detection may be possible, see, e.g., Wang et al. (U.S. Patent Application Publication No. 2017/0185868 A1), and newer, more efficient error detection methods may be used, but various embodiments described herein are instead more specifically directed to LPR error correction rather than to LPR error detection per se.

Thus, in the example of FIG. 1, at 120-124, LPR error correction methods such as those describe herein may be employed by an LPR error correction module in order to generate LPR correction candidates for an erroneous LPR record, in some embodiments, and to determine an actual corrected license plate number, which may, in some embodiments, be selected from among a plurality of candidates.

More specifically with regard to possible error correction methods, various techniques are possible, and different steps may be performed in different orders. In this example embodiment, a system may begin with automatically generating a set of candidates for potentially correct license plate numbers by analyzing driving patterns as identified above at 104, and correlating the driving patterns with the error pattern probability matrix updated at 112 and similarity values generated at 122. With similarity value results of 122, a system may leverage intersection among multiple candidates to find one candidate that is the most similar to an erroneous license plate number with respect to probability of being the same license plate number based on the actual driving patterns identified at 104 the error pattern probability matrix updated at 112. Details of such an error correction method will be further explained in the following paragraphs.

LPR sensors may identify vehicles passing by the LPR sensors stations by reading the license plates with image-processing technology, including optical character recognition (OCR) and, in some embodiments, possibly employing other image- or pattern-recognition techniques. LPR sensor stations may be distribute at busy intersections in a city, for example, or at any points of ingress or egress of a particular area, such as at highway on-ramps, off-ramps, in some embodiments, or at toll booths or checkpoints, in other embodiments. Each data record may include a vehicle's license plate, a plate color, a corresponding LPR station identifier, and a time stamp, among many other possible metadata fields. An example of LPR data records collected at a particular LPR station may be found in the following table:

TABLE 1

| PLATE_NUM | PLATE_COLOR | STATION_NO | COLLECT_TIME |
|---|---|---|---|
| AK5U12 | 3 | 6,247 | May 9, 2016 7:00:00.0 AM |
| ASU528 | 3 | 6,247 | May 9, 2016 7:00:01.4 AM |
| AKP070 | 3 | 6,247 | May 9, 2016 7:00:02.7 AM |
| AQ83H7 | 2 | 6,247 | May 9, 2016 7:00:10.1 AM |
| AJ8A99 | 3 | 6,247 | May 9, 2016 7:00:10.2 AM |

In an embodiment, if cameras or sensors at an LPR station fail to read the plate numbers, the field of the table corresponding to plate number may be recorded with a null, undefined, or "unknown" value, for example.

Falsely recognized LPRs may have a tendency to follow certain patterns. More specifically, some characters may be misidentified as some more often than others. For example, the letter "B" may often be recognized as the number "8"; the number "0" may often be recognized as the letter "D"; the number "1" may often be recognized as the letter "I"; many similar examples may be understood upon observation. Such substitutions may become apparent upon analyzing driving pattern data with erroneous LPR results controlled against known values, which may be part of a machine learning training process for specific systems, LPR stations, cameras, sensors, etc., in some example embodiments.

In some embodiments employing traditional OCR techniques, individual characters in license plate numbers may be independently recognized, and so any misrecognized characters may be treated as independent events in terms of probability. Recurring error patterns may be learned and represented by an error pattern probability matrix of each character and the probability of being misrecognized to all the other characters. One example is shown in below table, representing the matrix of a single camera station. The numbers in the cells of Table 2 represent probabilities of actual characters in the left column being misidentified as any of the character values listed in the top row. Some embodiments may cap the sum of any column or row to a value of 1. Some embodiments may require each row and each column to total a value of 1.

TABLE 2

| Error Pattern Probability Matrix (EPPM) | | | | | | | | |
|---|---|---|---|---|---|---|---|---|
| | | Misidentified Character | | | | | | |
| | | A | B | ... | Z | 0 | ... | 8 | 9 |
| Actual Character | A | — | 0.02 | ... | 0.01 | 0 | ... | 0 | 0 |
| | B | 0.01 | — | ... | 0.02 | 0.4 | ... | 0.4 | 0.2 |
| | ... | ... | ... | — | ... | ... | ... | ... | ... |
| | Z | 0.02 | 0.01 | ... | — | 0.01 | ... | 0 | 0 |
| | 0 | 0.3 | 0.1 | ... | 0 | — | ... | 0.3 | 0.1 |
| | ... | ... | ... | ... | ... | ... | — | ... | ... |
| | 8 | 0.01 | 0.57 | ... | 0.01 | 0.1 | ... | — | 0.2 |
| | 9 | 0 | 0.01 | ... | 0.01 | 0.05 | ... | 0.1 | — |

When collecting LPR data, it may not be readily apparent that there may be an error in any one data point. Patterns may not necessarily emerge even once a large volume of millions of LPR records have been collected. By analyzing license plate numbers across sequences of consecutive adjacent LPR stations within a predetermined time period, however, certain patterns may be expected, and deviations from those patterns may be suspected as possible errors. For example, in a sequence of adjacent stations A, B, and C, if A reads one plate at time $t_A$ and C reads the same plate at time $t_C$, then intervening station B would be expected to have read the same plate around time $t_B$. If station B does not have the same reading, then plates read by station B during the intervening time period (and some extra time margin, to account for any clock drift, network delay, or other similar delay) would be expected to have at least one LPR record having characters that are similar to those of the same plate successfully read at stations A and C. Here, "similar" means probabilistically similar, such as would be likely misidentified per a probability threshold or similar metric applied to an error pattern probability matrix corresponding to the LPR station, camera, or sensor.

Thus, if there is a similar reading of probabilistically similar characters, or if there are many other overlapping characters, between station A and station B and between station B and station C at the expected time, then this LPR record at station B may likely have been misrecognized and may be indicated as such.

For machine learning involved in determining triple station patterns involving three adjacent stations, the triple stations A, B, and C of the examples above may alternatively be denoted as $S_{i-1}$, $S_i$, $S_{i+1}$, in this example, with i for i=2 ... n−1. The LPR records of these triple stations may be extracted from vehicles' LPR trajectories, which contain the passing sequence of LPR stations. Here, i denotes the travel sequence of a vehicle. This problem can be divided and obtained by combing both adjacent station pairs ($S_{i-1}$, $S_i$) and ($S_i$, $S_{i+1}$).

For each $S_i$, there may be several permutations of triple stations. Some combined triple stations would probably be $S_{i-1}$, $S_i$, $S_{i+2}$ or $S_{i-2}$, $S_i$, $S_{i+1}$ caused by LPR failing completely at $S_{i-1}$ or $S_{i+1}$, for example, or for forks in the road. Here two constraints of selection may be evaluated before determining a combination of three stations as a triple station: (a) $c_{ij} > \mu$, (b) $p(S_{i+1}|S_i) > p$. Here, $c_{ij}$ denotes the number of vehicles sequentially passing from $S_i$ to $S_{i+1}$. In some embodiments, transition probability from $S_i$ to $S_{i+1}$ may be given by $$p(S_{i+1} | S_i) = \frac{c_{ii+1}}{\sum_{j \in S} c_{ij}}.$$

In an embodiment, the combination condition (threshold) may be set to p>0.1 and μ=30. Depending on desired or necessary results, these values may be adjusted in order to achieve different statistical confidence intervals of LPR detection and correction.

Figure 2A:
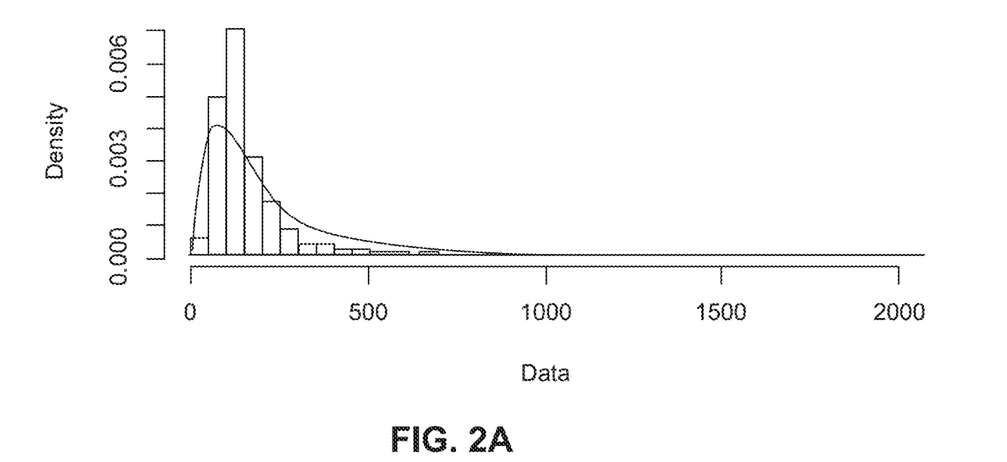
FIGS. 2A and 2B illustrate a component of trip-time learning that may facilitate the generation of a transition probability matrix to determine a driving pattern.
Figure 2B:
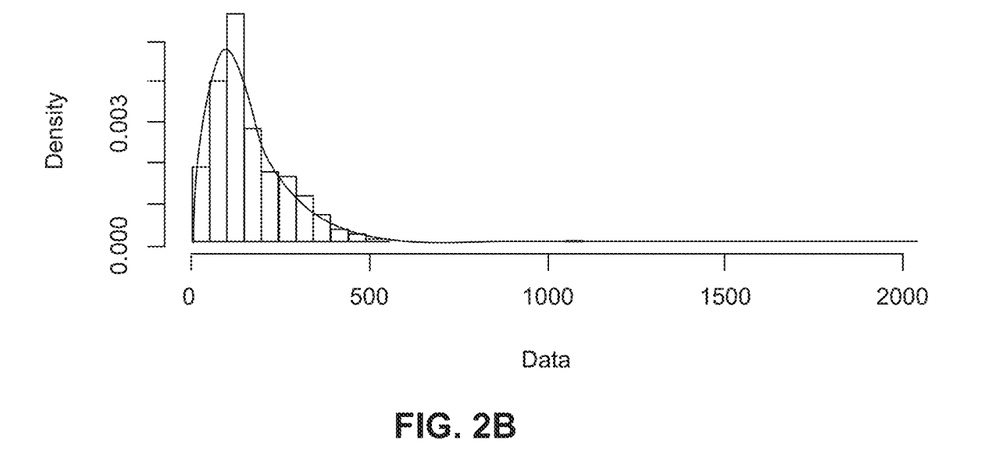

FIGS. 2A and 2B illustrate a component of trip-time learning that may facilitate the generation of a transition probability matrix to determine a driving pattern. In order to gain perspective and filter LPR results, timing and probability relationships may be leveraged to target data for sets of LPR stations in a given spatial locality, and relevant results may emerge according to parameters chosen.

For example, an actual and/or expected duration of time for a vehicle to travel between any given pair of stations may be a factor in measuring trajectory of a vehicle. In some embodiments, each pair of stations may involve two stations relatively close to each other. It may be assumed that the trip duration between each station pair is constant. In practice, measured trip times between each pair of stations in a network of LPR stations may arrange itself along a log-normal distribution. As shown in FIGS. 2A and 2B, a model log-normal distribution may have a high correlation with the actual data, showing a close fit.

For example, each of FIG. 2A and FIG. 2B shows a plot of actual LPR data collected from LPR stations in an urban region. The rectangles in each plot represent a frequency or probability density of trip durations between substantially equidistant pairs of LPR stations. The curvilinear overlay represents a log-normal regression having a high correlation with the data for each of FIGS. 2A and 2B.

By maximum likelihood estimation, parameters $(\mu_{i,i+1}, \sigma_{i,i+1})$ may be obtained corresponding to parameters of the log-normal distribution of $(S_i, S_{i+1})$. The driving pattern passing by three adjacent stations may be represented in a transition probability matrix as below:

TABLE 3

Driving Patterns in a Transition Probability Matrix

| $S_{i-1} \, S_i$ | $S_i \, S_{i+1}$ |
|---|---|
| $\mu_{i-1, i}$ | $\mu_{i, i+1}$ |
| $\sigma_{i-1, i}$ | $\sigma_{i, i+1}$ |

Triple station driving patterns in a transition probability matrix transition may indicate that a certain vehicle has passed by a certain set of three LPR stations within a predetermined amount of time. In some embodiments, in the time it would realistically take for a given vehicle to travel between $S_i$ and $S_{i+1}$, then the travel time $t_{ij}$ between them satisfies the condition below with a 95% confidence interval:

$$\left| \frac{\ln(t_{ij}) - \mu_{ij}}{\sigma_{ij}} \right| < 1.96$$

For any misrecognized license plate numbers in each station $S_i$, a corresponding correct license plate number may be determined by selecting a vehicle that is detected as passing by both $S_{i-1}$ and $S_{i+1}$ sequentially but not selected as passing by $S_i$ within a predetermined amount of time or predetermined amount of time as a candidate for LPR error correction. Upon such a determination that an intervening station has been apparently skipped, LPR error correction may be attempted by assigning a candidate plate number as the correct license plate number 126 to the falsely recognized license plate number, in some embodiments, according to a highest total probability of independently misrecognized character(s), as determined by the error pattern probability matrix.

In some embodiments, given the independent nature of OCR misidentifications per character, if any character of a correction candidate is not likely to be a match (below a certain probability threshold) for a detected erroneous license plate number, then this candidate may be discarded as a failed match. For example, in some unusual cases, where multiple erroneous plate numbers are detected in the same time period at the same station, and a correction candidate matches multiple erroneous license plate numbers, then the correction process may be configured to err on the safe side, potentially allowing the correction to fail for the multiple erroneous license plate numbers affected.

As an example of further calculations underlying the use of EPPM 114, further descriptions of error pattern probability matrix learning and error probability scoring are provided herein. For added context and completeness, it may be noted that error pattern probability matrix (EPPM) 114 may also be referred to as an error pattern matrix, an error transition matrix, a misrecognition matrix, and/or a confusion matrix, for example. For consistency in this specification, the term error pattern probability matrix (EPPM) will be used.

Given a training set (also known as a calibration set) of LPR data samples of the misidentified license plate numbers and their corresponding true license plate numbers (which may be determined by manual review and entry), in some embodiments, an LPR correction system may construct an EPPM that represents all available license plate characters (letters, numbers, punctuation, geographic designations, other characters, identifying marks, or symbols) that may be used in the jurisdiction where the LPR station is deployed, eliminating invalid OCR candidate characters that could not be used in certain license plates, and each available character being mapped to corresponding probabilities of being misidentified as a certain other available character. Here, the "false" character is denoted as $w_i$, and its corresponding character of the "true" character as $w_j$. Probability of $w_j$ being misrecognized as $w_i$ may be defined as follows:

$$p(w_i | w_j) = \frac{c_{ij} + 1}{\sum_{k \in Z, k \neq j} c_{kj} + n}$$

Here, $c_{ij}$ is the frequency (number of times) that $w_j$ is misrecognized as $w_i$, and Z denotes the character set of all available license plate characters, the character set being of size n. To prevent irregular behavior that may be caused by a zero value of $c_{ij}$, additive smoothing may be used, in some embodiments, such that a value of 1 may be added to the numerator (add-one smoothing), and a value of n may be added to the denominator, maintaining expected values relative to the size of the possible character set, and keeping $p(w_i | w_j)$ as Laplace-smooth categorical data. In some embodiments, as the pattern changes over time, the EPPM for each station may be updated dynamically and/or periodically.

With respect to error correction methods, given an erroneous license plate number, a correct license plate number 126 may be the candidate in the candidate set with the highest probability of being misrecognized, as calculated based on the EPPM. The candidate set may be composed of LPR records in LPR stations adjacent to where the potentially erroneous license plate numbers may have been detected, within the predetermined amount of time, in this embodiment having a 95% confidence interval:

$$\left| \frac{\ln(t_{ij}) - \mu_{ij}}{\sigma_{ij}} \right| < 1.96$$

In some embodiments, for each misidentified license plate number, the similarity score between itself and the candidate plate with a logarithmic probability of each different character may be calculated as follows:

$$S_{score} = \sum_{i \in S, j \in C, i \neq j} \log(p(w_i | w_j))$$

Here, $w_i$ and $w_j$ denote different characters in any one of location of two corresponding LPR records, with $w_i$ being a falsely recognized erroneous character to be corrected by substituting $w_j$ in lieu of $w_i$. This substitution for LPR error correction may thus be performed character-by-character in an LPR record, as each character may be independently recognized using OCR. The corrected LPR record may be the candidate plate number with the highest similarity score to the reference plate numbers from the other adjacent LPR stations. For example, given a misrecognized LPR plate number 'A67898' and two candidate plates 'A67890' and 'A67889' here, the similarity score of the two pairs ('A67898' vs. 'A67890' and 'A67898' vs. 'A67889') may be calculated as described in the following two paragraphs.

Based on the example probability values in the EPPM of Table 2, the value of $p(w_i|w_j)$ resolves to the probability value of $w_j$ being misrecognized as $w_i$, which may be looked up in the EPPM. To simplify calculations, in some embodiments, only values having any probability of misrecognition would be looked up, and only where they are different between the potentially erroneous license plate number and the correction candidate license plate number, for example.

Thus, to determine the similarity score of 'A67898' versus 'A67890' in this case, $w_i$=A67890, as the candidate presumed true for comparison, and $w_j$=A67898 being the potentially erroneous license number assumed to have been falsely recognized, p(A67898|A67890) may be reduced to p(8|0) (the last character being the only one that is different). Looking up the likelihood of a real 0 ($w_j$=0) being misidentified as an erroneous 8 has a probability of 0.6, according to Table 2 in this particular embodiment. Thus $S_1$=log (0.6)=−0.2218. Along the same lines, the similarity score of 'A67898' and 'A67889' may be calculated as $S_2$=[log(0.1)+ log(0.2)]=−1.6990. In this example, based on the fact that $S_1$ is greater than $S_2$, 'A67898' will be corrected to 'A67890' as the license plate number corresponding to $S_1$.

Figure 3:
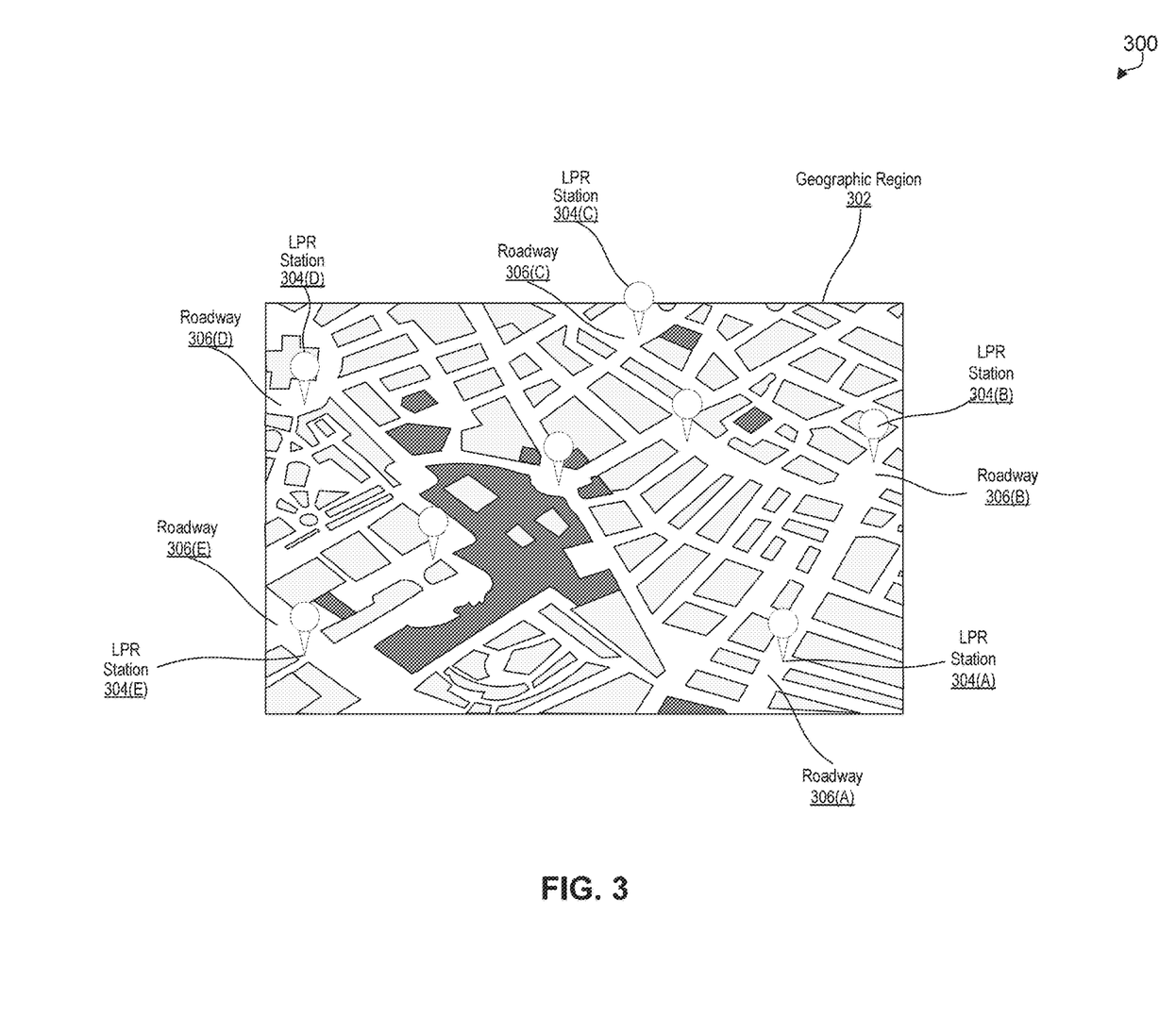
FIG. 3 illustrates a geographic region including a plurality of LPR stations, according to some embodiments.

FIG. 3 illustrates a geographic region 302 including plurality of LPR stations 304 (not all of which are numbered, for the sake of clarity; LPR stations may also be called driving stations, in some embodiments). LPR stations 304 may be equipped with license plate recognition devices, according to exemplary embodiments. In the example of FIG. 3, the geographic region 302 includes roadways 306 (not all numbered, for clarity) for vehicular traffic. Further, in the example of FIG. 3, LPR stations 304 may be located along the roadways 306 (and others) for collection of vehicular information. As described herein, the driving stations or LPR stations 304 may include vehicle identifier recognition devices (e.g., LPR devices such as cameras or sensors) to collect vehicular information.

Figure 4:
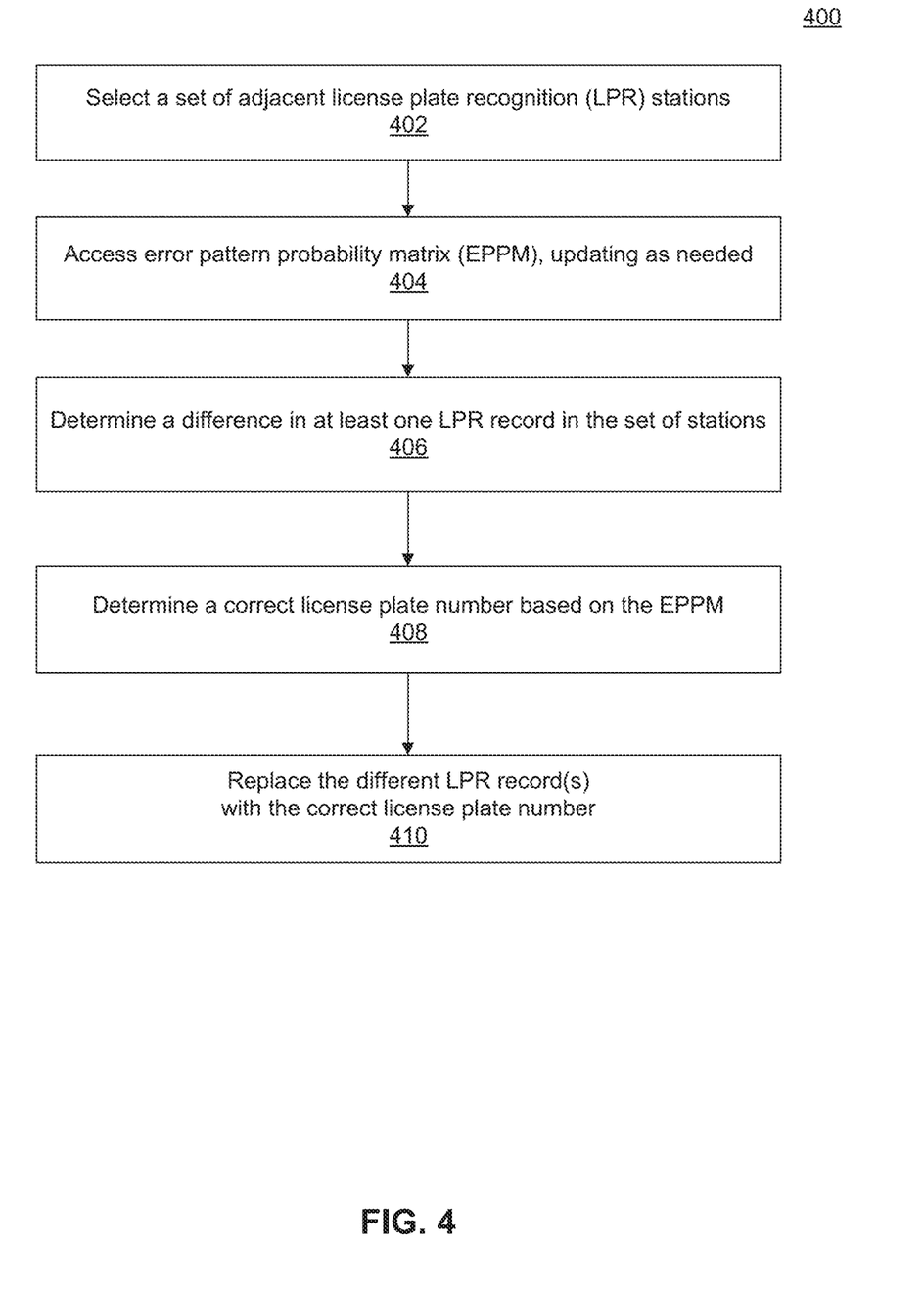
FIG. 4 is a flow diagram illustrating an example process for fully data-driven automatic detection and correction of misidentified license plate numbers, according to some embodiments.

FIG. 4 is a flowchart illustrating a process 400 for detecting cloned vehicle identifiers, according to some embodiments.

Process 400 may be performed by processing logic that may include hardware (e.g., circuitry, dedicated logic, programmable logic, microcode, etc.), software (e.g., instructions executing on a processing device), or any combination thereof.

It is to be appreciated that not all steps may be needed to perform the disclosure provided herein. Further, some of the steps may be performed simultaneously, or in a different order than shown in FIG. 4, as will be understood by a person of ordinary skill in the art.

At 402, a processor such as processor 502 may be configured to select a set of adjacent LPR stations. For example, in an embodiment, a set may include a first LPR station, a second LPR station, and a third LPR station, the first LPR station having generated a first recognized license plate number, the second LPR station having generated a second recognized license plate number, the third LPR station having generated a third recognized license plate number, and so on. Additionally, in some embodiments, the first recognized license plate number, the second recognized license plate number, and the third recognized license plate number may have been generated within a predetermined amount of time to be considered in a set for a pattern, for example.

At 404, processor 502 may access EPPM. Depending on the state of EPPM and how information such as probability data therein may be updated, accessing EPPM may include reading, writing, or modifying the contents of EPPM. For example, with a static EPPM, read-only access may be sufficient. For a dynamically updated EPPM, probability values may be periodically updated, or updated upon an event, such as processing a new set or every nth set, for example. For a new EPPM, in some embodiments, accessing the EPPM may involve populating the EPPM with a new set of probability data, for instance.

At 406, processor 502 may determine a difference in at least one LPR record in the set of stations. For example, this operation may be analogous to 108 depicted in FIG. 1 and as described above. A result of this operation may include an LPR miss or error candidate as necessary. At another stage of execution, it may be determined whether the LPR miss corresponds to a different vehicle, or instead to a falsely recognized LPR record.

At 408, processor 502 may determine a correct license plate number based on the EPPM. Additionally, this determination may also be based on the set and any pattern(s) identified within the set. This correction determination step may further involve any other learning or analytics techniques described herein, such as with respect to FIG. 1, including items 120-124. In some embodiments, detection and correction at least up to this operation may be fully data-driven, without any need for real-time interaction or manual intervention, but may be simply processed on bulk data imported into LPR database 102, for example.

At 410, if it is determined that the different LPR record(s) were indeed erroneous LPR records, processor 502 may replace the different, erroneous LPR record(s), substituting at least one correct license plate number in its place. In some embodiments, the correct license plate number may be selected from a set of candidate license plate numbers being considered for correction. Such correction candidates may be generated and selected from according to similar techniques as described with respect to 408, 120-124, etc. as disclosed herein.

Process 400 is disclosed in the order shown above in this exemplary embodiment of FIG. 4. In practice, however, the operations disclosed above, alongside other operations, may be executed sequentially in any order, or they may alternatively be executed concurrently, with more than one operation being performed simultaneously, or any combination of the above.

Thus, embodiments of the present framework described herein provide a systematic, automated approach to identify recognition errors from large amounts (e.g., millions to billions of entries) of data, such as license plate recognition data. One aspect of the framework described herein may facilitate automatic detection and correction of incorrectly recognized LPR records. The detection results may also be used to identify defective or malfunctioning sensors that acquired those erroneous data records. Additionally, the framework may automatically classify the failure of cameras and/or sensors by analyzing error distribution patterns. The framework may make use of recognition data acquired not only by one camera or sensor, but by a set of nearby cameras and/or sensors, so as to improve accuracy of error detection results and error correction candidates.

Embodiments of the present framework may be applicable to any city or region to facilitate, for example, LPR data operators and users in detecting erroneous recognition instances, monitor LPR sensors' operation statuses, identify causes of failure and provide suggestions for correction, etc. In some embodiments, the framework may be able to operate on structured or unstructured data, without processing any images, potentially making the whole process more efficient. Labor costs may be considerably reduced, as this automated system may render unnecessary any manual review of large amounts of LPR data, with the possible exception of calibration or training sets.

It should be appreciated that the framework described herein may be implemented as a method, process, apparatus, system, or article of manufacture such as a non-transitory computer-readable medium or device. For illustration purposes, the present framework may be described in the context of license plate recognition. It should be appreciated, however, that the present framework may also be applied in processing other types of recognition data that identifies other types of objects or text.

Any applicable data structures, file formats, and schemas may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

The data, files, and/or databases may be stored, retrieved, accessed, and/or transmitted in human-readable formats such as numeric, textual, graphic, or multimedia formats, further including various types of markup language, among other possible formats. Alternatively or in combination with the above formats, the data, files, and/or databases may be stored, retrieved, accessed, and/or transmitted in binary, encoded, compressed, and/or encrypted formats, or any other machine-readable formats.

Interfacing or interconnection among various systems and layers may employ any number of mechanisms, such as any number of protocols, programmatic frameworks, floorplans, or application programming interfaces (API), including but not limited to Document Object Model (DOM), Discovery Service (DS), NSUserDefaults, Web Services Description Language (WSDL), Message Exchange Pattern (MEP), Web Distributed Data Exchange (WDDX), Web Hypertext Application Technology Working Group (WHATWG) HTML5 Web Messaging, Representational State Transfer (REST or RESTful web services), Extensible User Interface Protocol (XUP), Simple Object Access Protocol (SOAP), XML Schema Definition (XSD), XML Remote Procedure Call (XML-RPC), or any other mechanisms, open or proprietary, that may achieve similar functionality and results.

Such interfacing or interconnection may also make use of uniform resource identifiers (URI), which may further include uniform resource locators (URL) or uniform resource names (URN). Other forms of uniform and/or unique identifiers, locators, or names may be used, either exclusively or in combination with forms such as those set forth above.

Any of the above protocols or APIs may interface with or be implemented in any programming language, procedural, functional, or object-oriented, and may be compiled or interpreted. Non-limiting examples include C, C++, C #, Objective-C, Java, Swift, Go, Ruby, Perl, Python, JavaScript, WebAssembly, or virtually any other language, with any other libraries or schemas, in any kind of framework, runtime environment, virtual machine, interpreter, stack, engine, or similar mechanism, including but not limited to Node.js, V8, jQuery, Dojo, Dijit, OpenUIS, AngularJS, Express.js, Backbone.js, Ember.js, DHTMLX, React, Electron, among many other non-limiting examples.

Figure 5:
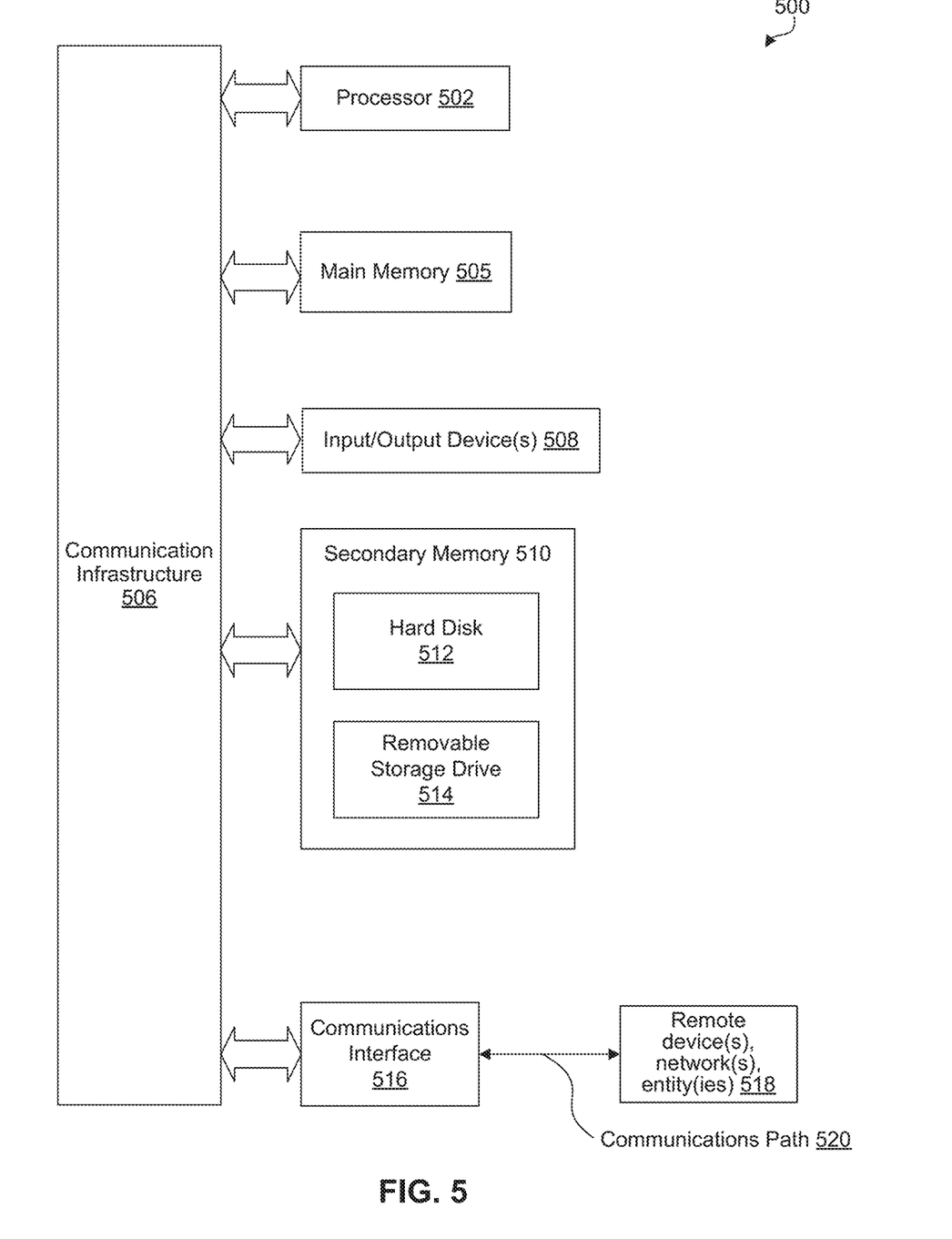
FIG. 5 illustrates select components of an example computer system useful for implementing various embodiments.

Various embodiments may be implemented, for example, using one or more well-known computer systems, such as computer system 500 shown in FIG. 5. Computer system 500 may be used, for example, to implement process 400 of FIG. 4. For example, computer system 500 may select a set of adjacent LPR stations, access EPPM, updating as needed, determine a different LPR record from the set of LPR stations where a matching LPR record would be expected, determine a correct license plate number based on the EPPM, and replace the different LPR record with the correct license plate number, according to an embodiment.

Computer system 500 includes one or more processors (also called central processing units, or CPUs), such as a processor 504. Processor 504 is connected to a bus or communication infrastructure 506.

Computer system 500 also includes user input/output device(s) 503, such as monitors, keyboards, pointing devices, etc., which communicate with communication infrastructure 506 through user input/output interface(s) 502.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes a primary memory or main memory 508, such as random access memory (RAM). Main memory 508 may include one or more levels of cache. Main memory 508 has stored therein control logic (i.e., computer software) and/or data.

Computer system 500 may also include one or more secondary storage devices or secondary memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a network interface or communication interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communications path 526.

A computer system may also be any one of a personal digital assistant (PDA), desktop workstation, laptop or notebook computer, netbook, tablet, smart phone, smart watch, or embedded system, to name a few non-limiting examples.

Any such computer system 500 may run any type of application associated with a layered repository facility, including legacy applications, new applications, etc.

Computer system 500 may be a client or server, accessing or hosting any applications through any delivery paradigm, including but not limited to remote or distributed cloud computing solutions; local or on-premises software ("on-premise" cloud-based solutions); "as a service" models, e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), or infrastructure as a service (IaaS); or a hybrid model including any combination of the foregoing examples or other comparable services or delivery paradigms.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use the configuration provider for layered repository using data processing devices, computer systems and/or computer architectures other than that shown in FIG. 5. In particular, embodiments may operate with software, hardware, and/or operating system implementations other than those described herein.

By way of another example, the computer system 500 may include, but is not limited to, a mobile phone or other mobile device, a personal digital assistant (PDA), a computer, a cluster of computers, a set-top box, a smart watch, a smart phone, a tablet, VR/AR headset or helmet, or other types of device capable of processing instructions and receiving and transmitting data to and from humans and other computing devices.

It is to be appreciated that the Detailed Description section, and not any other section, is intended to be used to interpret the claims. Other sections may set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
selecting, by at least one processor, a set of adjacent license plate recognition (LPR) stations comprising a first LPR station, a second LPR station, and a third LPR station,
wherein the first LPR station generated a first recognized license plate number,
wherein the second LPR station generated a second recognized license plate number,
wherein the third LPR station generated a third recognized license plate number,
wherein the first recognized license plate number, the second recognized license plate number, and the third recognized license plate number were generated within a predetermined amount of time, and
wherein the third recognized license plate number differs from at least one of the first recognized license plate number and the second recognized license plate number;
accessing, by the at least one processor, an error pattern probability matrix for at least the third recognized license plate number, wherein the error pattern probability matrix for at least the third recognized license plate number is accessed in relation to at least one of the first recognized license plate number or the second recognized license plate number differing from the third recognized license plate number; and
determining, by the at least one processor, a corrected license plate number based on the error pattern probability matrix.

2. The computer-implemented method of claim 1, further comprising:
substituting, by the at least one processor, the corrected license plate number in lieu of the third recognized license plate number.

3. The computer-implemented method of claim 1, further comprising:
substituting, by the at least one processor, the corrected license plate number in lieu of at least one of the first recognized license plate number or the second recognized license plate number.

4. The computer-implemented method of claim 1, wherein the third recognized license plate number differs from at least one of the first recognized license plate number or the second recognized license plate number by at least one character being different.

5. The computer-implemented method of claim 1, wherein the third recognized license plate number differs from at least one of the first recognized license plate number or the second recognized license plate number by having different quantities of characters.

6. The computer-implemented method of claim 1, wherein the third recognized license plate number differs from at least one of the first recognized license plate number or the second recognized license plate number by having no character in common.

7. The computer-implemented method of claim 1, wherein the predetermined amount of time is related to a statistical confidence interval.

8. A non-transitory computer-readable device having instructions stored thereon that, when executed by at least one computing device, causes the at least one computing device to perform operations comprising:
selecting a set of adjacent license plate recognition (LPR) stations comprising a first LPR station, a second LPR station, and a third LPR station,
wherein the first LPR station generated a first recognized license plate number,
wherein the second LPR station generated a second recognized license plate number,
wherein the third LPR station generated a third recognized license plate number,
wherein the first recognized license plate number, the second recognized license plate number, and the third recognized license plate number were generated within a predetermined amount of time, and
wherein the third recognized license plate number differs from at least one of the first recognized license plate number and the second recognized license plate number;
accessing an error pattern probability matrix for at least the third recognized license plate number, wherein the error pattern probability matrix for at least the third recognized license plate number is accessed in relation to at least one of the first recognized license plate number or the second recognized license plate number differing from the third recognized license plate number; and
determining a corrected license plate number based on the error pattern probability matrix.

9. The computer-readable device of claim 8, the operations further comprising:
substituting the corrected license plate number in lieu of the third recognized license plate number.

10. The computer-readable device of claim 8, the operations further comprising:
substituting the corrected license plate number in lieu of at least one of the first recognized license plate number or the second recognized license plate number.

11. The computer-readable device of claim 8, wherein the third recognized license plate number differs from at least one of the first recognized license plate number or the second recognized license plate number by at least one character being different.

12. The computer-readable device of claim 8, wherein the third recognized license plate number differs from at least one of the first recognized license plate number or the second recognized license plate number by having different quantities of characters.

13. The computer-readable device of claim 8, wherein the third recognized license plate number differs from at least one of the first recognized license plate number or the second recognized license plate number by having no character in common.

14. The computer-readable device of claim 8, wherein the predetermined amount of time is related to a statistical confidence interval.

15. An automatic license plate recognition correction system, comprising:
a memory; and
at least one processor coupled to the memory and configured to:
select a set of adjacent license plate recognition (LPR) stations comprising a first LPR station, a second LPR station, and a third LPR station,
wherein the first LPR station generated a first recognized license plate number, wherein the second LPR station generated a second recognized license plate number, wherein the third LPR station generated a third recognized license plate number, wherein the first recognized license plate number, the second recognized license plate number, and the third recognized license plate number were generated within a predetermined amount of time, and wherein the third recognized license plate number differs from at least one of the first recognized license plate number and the second recognized license plate number;

access an error pattern probability matrix for at least the third recognized license plate number, wherein the error pattern probability matrix for at least the third recognized license plate number is accessed in relation to at least one of the first recognized license plate number or the second recognized license plate number differing from the third recognized license plate number; and determine a corrected license plate number based on the error pattern probability matrix.

16. The system of claim 15, the processor further configured to:
    substitute the corrected license plate number in lieu of the third recognized license plate number.

17. The system of claim 15, the processor further configured to:
    substitute the corrected license plate number in lieu of at least one of the first recognized license plate number or the second recognized license plate number.

18. The system of claim 15, wherein the third recognized license plate number differs from at least one of the first recognized license plate number or the second recognized license plate number by at least one character being different.

19. The system of claim 15, wherein the third recognized license plate number differs from at least one of the first recognized license plate number or the second recognized license plate number by having different quantities of characters.

20. The system of claim 15, wherein the third recognized license plate number differs from at least one of the first recognized license plate number or the second recognized license plate number by having no character in common.

* * * * *